3,244,660
INERT SOLVENT RECOVERY IN SOLUTION
POLYMERIZATION
Robert J. Herold, Akron, Ohio, assignor to The General Tire & Rubber Company, Akron, Ohio, a corporation of Ohio
Filed Dec. 20, 1960, Ser. No. 77,157
10 Claims. (Cl. 260—29.7)

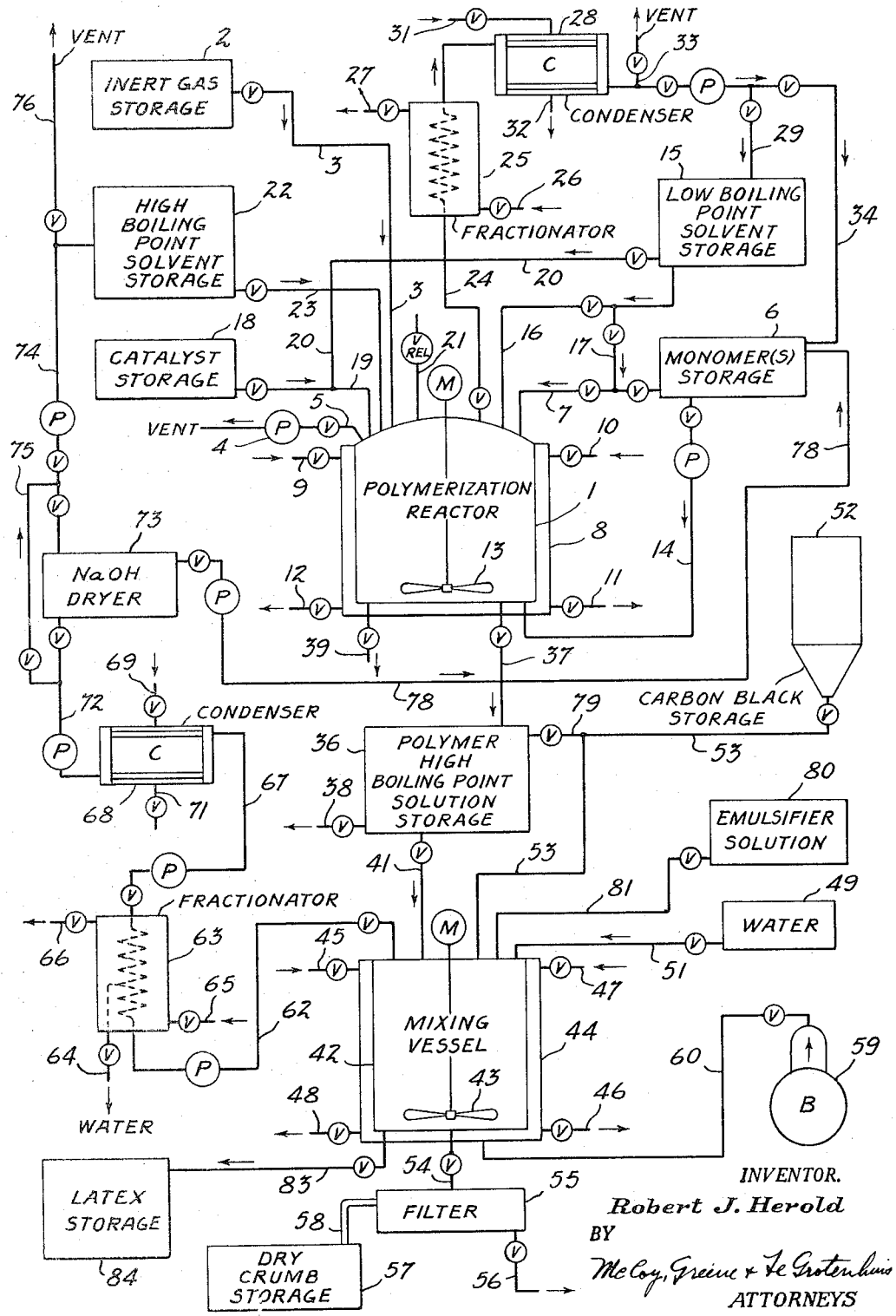

This invention relates to solution polymerization. More specifically, the present invention relates to a method of recovering an inert solvent employed in solution polymerization using ionic catalysts and to a method of treating the polymer produced by solution polymerization.

One of the problems in the polymerization of olefins, diolefins and cyclic oxides using ionic type catalysts, for example, the transition metal compounds reduced and/or complexed with metal alkyls, is solvent purification. Unless the solvent is purified to remove water and other reactive impurities it can poison the catalyst or reduce the percent conversion and molecular weight of the resulting polymer. However, the purification of large volumes of solvent needed in these polymerization processes can become quite expensive. Another problem encountered in solution polymerization is the difficulty in obtaining the polymer in a form which can be economically handled. Although mass or bulk polymerizations tend to give polymers of somewhat higher molecular weight, they result in solid materials which are not easily removed from the reactor unless large amounts of solvents are employed. Also, it is sometimes difficult to control the temperature of mass polymerizations. On the other hand, the temperature during solution polymerization can more easily be controlled and the resulting polymer being in solution in the solvent can readily be removed from the reactor. Although the solvent can be evaporated from the solution to obtain a solid mass, the solid polymer cannot easily be suspended in water or emulsified due to its great degree of agglomeration. Moreover, it is necessary to mill the polymer extensively under water to remove catalyst residues (fragments, reaction product etc.). Hence, it would be highly desirable to be able to treat the solution to obtain the polymer in the form of a crumb and which does not need extensive washing or to obtain a latex (a dispersion of the polymer in water) and to recover the polymerization solvent.

Accordingly, it is a primary object of the present invention to provide a process for solution polymerization in which the solvent employed for polymerization can be recovered and reused without the necessity for separate purification.

Another object is to provide a method for readily obtaining a dispersion of finely divided particles of a polymeric material in water or a latex.

A further object is to provide a method for obtaining a relatively dry polymeric crumb.

These and other objects and advantages of the present invention will become more apparent to those skilled in the art from the following detailed description, examples and accompanying drawing which is a diagrammatic representation of apparatus suitable for polymerization and recovery of polymer and solvent according to the present invention in which the symbol

"Ⓥ"

represents a valve,

represents a relief valve,

"Ⓜ"

a motor,

"Ⓟ"

represents a pump and the arrows "→" generally indicate the direction of flow.

According to the present invention it has been discovered that the essentially pure or highly refined solvent employed in the polymerization of polymerizable monomers can readily be recovered from the polymerization reactor or similar apparatus by mixing with the solution of polymer and solvent after polymerization another solvent having a boiling point at least 40° C. higher than the solvent used during polymerization and distilling off the lower boiling point solvent which can be stored for further use without the necessity for separate purification or which can directly be cycled back to the same or other polymerization reactor for use in further polymerizations. The solution of the polymer in the high boiling point solvent can then be removed from the reactor to another vessel and carbon black added to the solution. The resulting mixture can then be mixed with boiling water or steam stripped to remove the high boiling point solvent and leave the polymer as finely divided particles in the water rather than as an agglomerated mass which cannot be easily handled. The water and polymer particles then can be separated by filtration to provide relatively dry crumbs. Alternatively, the solution of polymer can be added to a dispersion of carbon black and water. A feature of the present method is that the high boiling point solvent does not need to be specially purified or refined since it takes no part in the actual polymerization process. It, also, can contain small amounts of water which can serve to destroy the catalyst and reduce the possibility of any subsequent deterioration of the polymer due to reversion and so forth. Conversely, the catalyst uses up the water or other active hydrogen containing impurities so that they cannot be recycled together with the dry solvent.

As shown in the accompanying drawing pressure polymerization reactor 1 is flushed with an inert gas such as nitrogen from supply tank 2 by means of line or pipe 3. After flushing out the reactor it can be evacuated by pump 4 connected to the reactor by line 5. One or more polymerizable monomers in storage tank 6 is delivered by line 7 to the polymerization reactor containing jacket 8 supplied with cold water by means of line 9 or with hot water or steam by line 10 for controlling the temperature of the reactor. The cold and hot water can be discharged from the jacket by means of lines 11 and 12, respectively. In place of using an exterior jacket the interior of the reactor can be equipped with heating or cooling coils but this may present problems in cleaning. Suitable stirring means such as propeller type agitator 13 is disposed in the reactor and driven by a motor to agitate the contents during polymerization. Where the monomer is normally a gas maintained under pressure, it can be delivered to the reactor by line 14 and bubbled through any solvent present.

The pure or essentially pure, highly refined, or non-reactive low boiling point solvent is delivered from storage tank 15 through line 16 to the reactor. Line 17 is positioned between lines 7 and 16 so that the solvent, or part of it if desired, can be mixed with the monomer and the resulting mixture delivered to the reactor instead of delivering the monomer and low boiling point solvent separately to the reactor. The catalyst is delivered from catalyst storage container 18 by means of line 19 to the reactor. A line 20 is also provided to mix if desired, part or all of the low boiling point solvent with the catalyst and deliver a mixture of the same to the reactor. Line 21 leads from the reactor to a pressure relief valve.

After the required amounts of catalyst, monomer and low boiling point solvent have been delivered to the reactor, and any inert gas if desired, heat is applied as necessary to effect polymerization. The contents of the reactor are also desirably agitated during polymerization by the agitator.

At the end of the polymerization reaction which can require several hours, or when the reaction has been carried to the desired degree of conversion of monomer to polymer or to the desired viscosity, the reactor can be cooled and then vented through line 5 and pump 4 to free it of any unreacted monomer if gaseous or of some of the solvent vapor before adding the high boiling point solvent which need not be specially purified. However, it is preferred to add the high boiling point solvent from its storage tank 22 through line 23 directly to the reactor to mix with the polymer dissolved in the low boiling point solvent without venting. Heat is then applied to the reactor to vaporize the low boiling point solvent through line 24 to still or fractionator 25 containing one or more plates and supplied if desired with hot water or steam by means of line 26 or otherwise heated to further fractionate the gases evolved from the reactor. The high boiling point solvent may be added gradually to the reactor during distillation to maintain a constant volume of solution and where the reactor is substantially full. Line 27 serves to discharge the hot water from the fractionator. The gas of the low boiling point liquid is then condensed to a liquid in condenser 28 and delivered by line 29 to the low boiling point solvent storage tank 15. Lines 31 and 32 serve to add and withdraw coolant from the condenser. Line 33 serves to discharge any non-condensibles to the atmosphere.

It is desirable to have one or more plates in the fractionator so that the gas evolved from the fractionator will contain a substantial amount of the low boiling point solvent or will be essentially or entirely the gas of the low boiling point solvent. It, of course, is recognized that in systems of 2 or more organic solvents, even if their boiling points are widely separated, the gases evolved on distillation will contain a mixture of the two solvents which will be dependent on their vapor pressures. The vapor at lower temperatures will consist largely of the low boiling point solvent and thus it is desirable to use the fractionator to reduce the concentration of the higher boiling point solvent or to eliminate it entirely. It will be understood that since the resulting solvent is pure or essentially pure, being free of water or other poisons which would poison the catalyst or otherwise inhibit polymerization, it can contain a small or minor amount of the higher boiling point solvent or even of the monomer since it is not deemed a poison. However, such solvent should be used with care when mixing with catalyst for delivery to the reactor to avoid some premature polymerization in the lines. Any deficiency in the amount of the low boiling point solvent can be overcome by adding fresh purified low boiling point solvent if desired.

The fractionator and condenser can also be employed to fractionate from the gas stream at lower temperatures any unpolymerized or unreacted monomer and return it as a liquid to monomer storage tank 6 by line 34 or even through line 29 to mix with the low boiling solvent, although this latter step is somewhat less desirable.

The solution of the high boiling point solvent and polymer is delivered to storage tank 36 by line 37 for holding prior to further treatment and in order to immediately release the reactor for further polymerization. Line 38 is provided from the tank for discharge of any of the solution needed as a cement, although line 39 from the reactor can be used for the same purpose or for cleaning.

Line 41 leads from the storage vessel to mixing vessel 42 in which the polymeric solution is further treated to convert it into a form siutable for making dry crumb or into a latex. The mixer is equipped with propeller type stirrer 43 driven by a motor or other suitable means and jacket 44 for the circulation of a coolant or cooling water by means of lines 45 and 46 or of hot water or steam and the like by lines 47 and 48.

Water is introduced into the mixer from tank 49 by line 51 and followed by the introduction of carbon black from storage bin 52 such as in the form of a slurry (aqueous) through line 53 to form a suspension. The mixture is then heated to boiling and the polymer solution added slowly with agitation. It is preferred to use only a minimum amount of water and to withdraw the polymeric globules or finely divided particles from the mixing zone as soon as they are formed through line 54 to filter 55 where the water is discharged by line 56 and the relatively dry crumb polymer particles discahrged to storage bin 57 through chute 58. The polymer particles can be dried further in the bin by means of hot air or elsewhere and then delivered to a calender for making sheet stock and the like. If carbon black or other finely divided pigment is not employed, the polymer will agglomerate in the mixer and cannot readily be handled.

During the mixing of the polymeric solution, carbon black and water, steam from boiler 59 is led through line 60 to the mixer to steam distill or strip the high boiling point solvent from the composition. The steam and solvent mixture pass by line 62 to fractionator 63 from which essentially all of the excess water can be removed by line 64. Lines 65 and 66 serve to charge and discharge heating fluid to the fractionator as desired. The gaseous high boiling point solvent then passes by line 67 to condenser 68 which contains charging and discharging lines 69 and 71 for a coolant, is condensed and further passed through line 72 and drier 73 to remove traces of moisture, and is finally delivered by line 74 to the storage tank. If the high boiling point solvent does not contain any appreciable amount of water, it can bypass the drier by means of line 75. 76 is a vent line for the high boiling point solvent recycle system. If desired, any residual monomer in the high boiling solvent can be separated by the fractionator and returned to the monomer storage tank by line 78.

Although as pointed out above the solution of the polymer and high boiling point solvent can be added to the carbon black and water dispersion in mixer 42, another way to obtain fine suspensions of polymer particles in water is to add the carbon black by line 79 to storage tank 36 and then to deliver a stream of the carbon black, polymer and high boiling point solvent mixture to the hot water or hot water and steam mixture in mixing tank 42.

An alternative method is to add the polymer-high boiling solvent to the hot water-carbon black mix, or to add the polymer-carbon black-high boiling solvent mix to the hot water, in an intermittent fashion, and after each addition, to agitate the mixture vigorously to break up any agglomerates while steam stripping and to form finely divided particles of the polymer suspended in the water.

If desired an emulsifier solution such as a soap solution from tank 80 by means of line 81 can be added to the polymer-water-high boiling point solvent mixture, preferably including carbon black, in mixer 42 and the resulting mixture rapidly agitated and distilled or steam stripped to make a latex which can be discharged by line 83 to storage tank 84.

Of course, the solution of the polymer and low boiling solvent could be mixed with water and carbon black (and/or soap) and boiled or steam stripped in the reactor or other vessel to remove the low boiling point solvent to leave a suspension of the finely divided polymeric particles in water or a latex. However, this would necessitate further careful fractionating and drying of the low boiling point solvent to rid it of any traces of water before recycling back to the reactor and would necessarily increase the costs of production.

While the accompanying drawing shows the use of several apparatus to prepare the polymer, store it, mix it and so forth, it is apparent that many of these steps such as the polymerization, high boiling point solvent addition, carbon black addition and steam stripping could be done in one apparatus.

The solvent to be employed either as the low boiling point or the high boiling point solvent should be non-reactive or inert toward the monomer and polymer which should be soluble in the low and high boiling point solvents. With respect to the low boiling point solvent it should not form complexes with the monomer or catalyst or otherwise interfere with polymerization. Since some of the high boiling point solvent may be carried over to the low boiling solvent during fractionation or distillation, it is preferred that the high boiling solvent also be a solvent which does not form complexes or interfere with polymerization. While carbon tetrachloride, chloroform, ethers and the like can be employed in some instances, it is much preferred to use the inert, hydrocarbon solvents which are free of aliphatic unsaturation. Examples of useful solvents, either as low or high boiling point solvents depending on their boiling points, are butane, pentane, isopentane, hexane, heptane, isoheptane, octane, nonane, decane, dodecane, isooctane, diisopropyl methane, 2-methyl heptane, 2,2-dimethyl butane, methyl cyclobutane, cyclohexane, cycloheptane, methyl cyclohexane, 1,4-dimethyl cyclohexane, benzene, amyl benzene, secondary butyl benzene, toluene, o-ethyl toluene, o-xylene, 4-ethyl-o-xylene, m-xylene, p-xylene, 2-ethyl-p-xylene, isodurene, hemimellitene, pseudocumene, mesitylene, cumene, and the like. There should be at least a difference of about forty degrees centigrade between the boiling points of the solvent used as the low boiling point solvent and the solvent used as the high boiling point solvent. The low boiling point solvent when initially charged to the reactor should be pure, essentially pure or highly refined so as not to interfere with polymerization. On the other hand, the high boiling point solvent should not contain any impurities whch would affect the polymer but can contain traces of water and the like which can serve to destroy the catalyst(s) or its residues, and does not need to be highly refined. Useful combinations of solvents to employ are pentane as the low B.P. solvent and toluene as the high B.P. solvent, hexane as the L.B.P. solvent and xylene as the H.B.P. solvent, cyclohexane and xylene, benzene and xylene and so forth.

The solvents are used in an amount sufficient to dissolve the polymers to provide a liquid or fluid mass and to provide for the necessary heat transfer. The solvents can be added gradually or all at once depending on the viscosity desired in the mixture or the degree of dilution desired. Large excesses of solvent should be avoided as this may require the addition of more heat and may reduce molecular weight. Also, large amounts of solvent are uneconomical in that they require considerable storage and handling equipment.

Mixtures of low and high boiling point solvents which form azeotropes should be avoided since they are difficult to handle and may have to be discarded, distilled with an excess of one of the solvents which is somewhat impractical, or distilled at very low pressures. Examples of constant boiling mixtures are shown in the Chemical Engineers' Handbook.

Monomers which should be pure and which can be polymerized according to the method of the present invention are those affording 1,4 addition and the like such as butadiene-1,3, isoprene, 2,3-dimethyl butadiene-1,3, piperylene, chloroprene and other dienes having from 4 to 8 carbon atoms and mixtures thereof; styrene, alpha methyl styrene, alpha chlorostyrene and mixtures thereof and mixtures of one or more of the styrenes and one or more of the above dienes; mixtures of olefins having from 2 to 8 carbon atoms such as mixtures of ethylene and propylene, ethylene and butylene and so forth.

Still other monomers can be polymerized according to the method of this invention such as the cyclic oxides. The cyclic oxides include any cyclic oxide having at least one oxygen-carbon ring in which an oxygen atom is joined to 2, 3, 4 or more carbon atoms in the ring which will open and polymerize with the same or other cyclic oxide monomers and having up to a total of 70 carbon atoms or more. These monomers, also, may contain 1, 2 or more, preferably only 1, aliphatic carbon-to-carbon double bond. The alkenyl, nitro, ether, ester and halogen substituted derivatives of these cyclic oxides can likewise be employed. The use of monomer mixtures having cyclic oxide monomer(s) containing aliphatic carbon-to-carbon double bond unsaturation in an amount of from about 0.5 to 30 mol percent or higher, the balance being the saturated cyclic oxide monomer(s), permits the resulting copolymer to be cured readily with materials such as sulfur and the like. A very useful mixture is one containing propylene and/or butylene oxide in an amount of from about 85 to 99.5 mol percent and allyl glycidyl ether, vinyl cyclohexene monoxide and/or butadiene monoxide in an amount of 15 to 0.5 mol percent to obtain a crosslinkable (by sulfur) copolymer. Minor amounts, from about 0.5 to 20 mol percent of a third, fourth or fifth etc. monomer, such as 1,2-butene oxide, 2,3-hexene oxide etc. of from 4 to 12 carbon atoms, can be present to break up or to substantially entirely eliminate any crystallinity in the copolymer when desired, especially where only small amounts of an unsaturated monomer are used, and to obtain more flexibility in processing and molding when such is desired. Those polymers which have no ethylenic unsaturation can be cured with mixtures of sulfur and organic peroxides or other curing system.

Examples of useful cyclic oxides are ethylene oxide, propylene oxide, 1,2-butene oxide (or 1,2-epoxy butane), 2,3-butene oxide, epichlorohydrin, 1,2-dodecene monoxide, isobutylene monoxide, styrene oxide, 1,2-pentene oxide, isopentene oxide, 1,2-diisobutylene oxide, 1,2-hexene oxide, 2,3-hexene oxide, 1,2-heptene oxide, allyl glycidyl ether, isoheptene oxide, octene oxide, nonene oxide, decene oxide, hendecene oxide, methyl glycidyl ether, ethyl glycidyl ether, vinyl cyclohexene monoxide, nitro ethylene oxide, butadiene dioxide, phenyl glycidyl ether, 3-methyl-3,4-epoxy butene-1, butadiene monoxide, vinyl cyclohexene dioxide, glycidyl methacrylate, 2,3-diisobutylene oxide, dicyclopentadiene monoxide, limonene dioxide, isoprene monoxide, oxetane ($C_3H_6O$), the diglycidyl ether of pentanediol, (3,4-epoxy-6-methyl cyclohexyl methyl) - 3,4 - epoxy-6-methyl cyclohexane carboxylate, the reaction product of the diglycidyl ether of pentanediol and bisphenol-A, 3,3-dimethyl oxetane, 1-epoxy ethyl-3,4-epoxy cyclohexane, 3-allyl-3-methyl oxetane, 3-vinyl-3-methyl oxetane, pentadecene oxide, 3,3-diethyl oxetane, 3-ethyl-3-butyl oxetane, 3-chloromethylene oxetane, 3 - chloro - methyl-3-methyl oxetane, 3-methyl-3-ethyl oxetane, 1,2-epoxy pentacosane, tetrahydrofuran, 1,4-dichloro-2,3-epoxy butane, allyl epoxy stearate, hexacontene oxide, heptacontene oxide, the reaction product of the diglycidyl ether of pentane diol and a polyalkylene and/or arylene ether glycol and other cyclic oxides. These cyclic oxides should preferably have a total of from 2 to 25 carbon atoms. Of these materials it is even more preferred to use the lower molecular weight cyclic oxides such as ethylene oxide, propylene oxide, butylene oxide etc. containing from 2 to 12 carbon atoms with minor amounts of unsaturated cyclic oxides, such as allyl glycidyl ether, butadiene monoxide and vinyl cyclohexene monoxide, etc. containing from 3 to 12 carbon atoms. Mixtures of these cyclic oxides can be used.

The catalyst, which can be a mixture or reaction product, is an ionic type catalyst. An example of a suitable catalyst is the Ziegler type catalyst comprising titanium tetrachloride and aluminum triisobutyl. Other catalysts which can be employed are the reaction product of zinc cyanide and aluminum chloride and the like as shown in copending patent application of Heinz Uelzmann, entitled "Methods and Compositions" and filed Octorber 25, 1960, S.N. 64,695; nickel cyanide and lithium aluminum hydride as shown in copending application of Robert J. Belner filed November 2, 1960, entitled "Compositions and Methods," S.N. 66,698; zinc diphenyl and water and so forth as shown in copending patent application of Marco A. Achon, filed June 28, 1960, S.N. 39,224; zinc diethyl and hydrogen sulfide, etc. as shown in copending application of Robert J. Herold et al., filed June 1, 1960, S.N. 43,263; aluminum triisobutyl and the reaction prodproduct of titanium tetrachloride and antimony trifluoride, etc. as shown in copending patent application of Robert J. Herold et al., filed May 17, 1960, S.N. 29,567; zinc diethyl and water, etc. as shown in copending patent application of Junji Furukawa et al., filed November 20, 1959, S.N. 854,257; zinc diethyl and alumina, etc. as shown in copending patent application of Junji Furukawa et al., filed November 20, 1959, S.N. 854,256; and zinc chloride and aluminum isopropoxide, etc. as shown in copending patent application of Charles C. Price, filed August 8, 1960, S.N. 47,958 and the parent application cited therein. Still other ionic catalyst systems can be employed in the practice of the present invention.

The catalyst or catalyst reaction product mixture is used in a minor amount by weight only sufficient to catalyze the reaction. Large amounts are usually wasteful and may in time cause reversion or subsequent decomposition of the polymer. In general, there is used a total of from about 0.0001 to 20 parts by weight of the catalyst based on a total of 100 parts by weight of the olefin, diolefin or cyclic oxide monomer or monomers being polymerized. However, it is preferred to use a total of from about 0.10 to 7.0 parts by weight of the catalyst based on 100 parts by weight of the monomer(s). The lower catalyst concentrations give higher molecular weight polymers. Examples of some specific catalyst concentrations will be found in the aforementioned copending patent applications.

The monomers can be polymerized under inert and/or non-oxidizing conditions, for example, under an atmosphere of nitrogen, argon, neon, helium, krypton or other inert atmosphere. The inert gas can be omitted and the monomer polymerized in the solvent only under pressure from any vaporized solvent or gaseous monomer. Since many of the reactants are volatile and to avoid oxidation, the polymerization should be conducted in a closed container and may be under pressure. Polymerization can be conducted at temperatures of from about 0° C. to 150° C., preferably from about 20° C. to 80° C. Still other temperatures can be used if desired. The catalyst or catalyst residues can be removed if desired by centrifuging a solution of the polymer. If it is desired to destroy of kill the catalyst, or its residues, the polymer may be treated with alcohol solutions or dilute solutions of acids and the like. Alkaline materials may be used to neutralize the catalyst. In many instances the addition of the water will largely destroy the catalyst. The removal of the catalyst will depend upon the ultimate use of the polymer. It is very desirable to polymerize while agitating the contents.

In the event that any gel forms and where it is not desired to have gel or a crosslinked (resinous) polymer but rather a rubbery or tacky solid polymer, inhibitors may be added. Examples of useful inhibitors are nitrobenzene, dinitrotoluene, dinitrodiphenyl, nitrodiphenyl amine, chlorodinitrobenzene and so forth. In some instances gel formation may be avoided by polymerizing in the dark. Antioxidants such as phenyl beta naphthylamine, also, are desirably added prior to or during polymerization.

In place of using finely divided carbon black other finely divided pigments or reinforcing agents can be mixed with the polymeric solution in storage tank 36 or mixer 42 such as finely divided silica, iron oxide, titanium dioxide and similar inorganic pigments. The amount of carbon black or other pigment can vary from about 25 to 75 parts by weight based on 100 parts by weight of the polymer (as dry solids).

Many of the polymers and copolymers, etc. obtained by the method of the present invention have a high average molecular weight, i.e., from about 20,000 to 500,000 or higher, as shown by their high viscosities. They are partially crystalline and/or amorphous and are soluble or substantially soluble in the low and high boiling point solvents. The resinous and rubbery polymers are useful as coatings for fabrics, films for packaging materials, elastic fibers, adhesives, and in making tires, tubes, shoe heels, raincoats, rubbery laminates, upholstery materials, floor mats and tiles, molded articles, golf ball covers, centers and cores, sponges and the like. Low molecular weight solid or grease-like polymers are useful as plasticizers and extenders for natural and synthetic resins and rubbers.

The polymers may be compounded with the usual rubber and resinous compounding materials, such as curing agents, anti-degradants, reinforcing agents, fillers, extenders, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, sulfur, 2-mercaptobenzothiazole, bis-(morpholyl) disulfide, bis(benzothiazyl) disulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl beta naphthylamine, pine oil, mineral oil, hydroquinone monobenzyl ether, mixtures of octylated diphenylamines, styrentated phenols, aldol alpha naphthylamine, diphenyl amine acetone reaction products, antimony oxide, asphalt, coumarone indene resin, natural rubber, polyisoprene, butadiene-styrene rubber or resin, nitrile rubber, acrylonitrile-styrene resin, polyester and/or ether urethanes, polyvinyl chloride and the like and mixtures thereof.

The following examples will serve to illustrate the invention with more particularity to those skilled in the art:

*Example I*

Purified butane was placed in a polymerization bottle flushed out with nitrogen (lamp grade) and $TiCl_4$ and aluminum triisobutyl added under nitrogen. The bottle was capped and purified isoprene was introduced by means of a syringe and the isoprene polymerized. At the end of the polymerization, benzene was added and the resulting solution flash distilled (1 plate) to obtain the butane which was then recovered and used to polymerize another charge of isoprene using the same general method. The conditions and results obtained are shown below:

| Run No. | Butane, cc. | Benzene added following PZN, cc. | Reaction Time, hrs. | Polymer Yield, Percent |
|---|---|---|---|---|
| A | 100 | 100 | 1.0 | 10 |
| B | [1] 100 |  | .75 | 19 |

[1] Flash distilled from Run A. Constant conditions:
Mole of Ti per liter of solvent _____ 0.029
Mole ratio of Al to Ti _____ 1.0
Moles of isoprene added per mole of Ti _____ 170
Polymerization temperature, °C _____ 22

This example shows that the flash distilled butane was sufficiently pure for subsequent polymerization of the isoprene.

*Example II*

The method of this example was the same as that of Example I, above, except that butadiene-1,3 was used in place of isoprene, the low boiling point solvent was benzene instead of butane, the high boiling point solvent was xylene instead of benzene and the cocatalyst was $TiI_4$ instead of $TiCl_4$. The results obtained were similar.

When the polybutadiene of the first run of Example II was obtained by merely drying or evaporating the solvent and then attempts were made to mill in carbon black in the Banbury, it was very difficult to get a homogeneous dispersion and the polymer and carbon black did not band readily on the mill. On the other hand, when carbon black and water were mixed with the xylene-polybutadiene solution and then steam stripped and dried, the resulting carbon black loaded polymer formed finely divided particles, readily banded on a 2-roll rubber mill and did not require the use of a Banbury.

It is to be understood that in accordance with the provisions of the patent statutes the methods or processes disclosed herein are presented for purposes of illustration and explanation and that various changes can be made in these methods or processes without departing from the spirit of the present invention.

What is claimed is:

1. The method which comprises adding to a composition comprising a solution of an essentially pure inert liquid organic solvent of at least 4 carbon atoms and a polymeric material obtained by polymerizing at a temperature of from about 0° to 150° C. a monomeric material with an ionic catalyst in said solvent which is a solvent for said polymeric material, a second named liquid organic solvent for said polymeric material and having a boiling point of at least about 40 degrees centigrade higher than the boiling point of said first named solvent, heating the resulting solution of said solvents and polymeric material at a temperature sufficient to evaporate substantially all of said first named solvent from said solution and below the boiling point of said second named solvent, withdrawing the resulting vaporized first named solvent and cooling and condensing said first named solvent for mixing with fresh polymerizable monomeric material and ionic catalyst, said monomeric material being selected from the group consisting of (a) at least one diene having from 4 to 8 carbon atoms and affording 1,4 addition, (b) at least one styrene, (c) mixtures of (a) and (b), (d) mixtures of straight-chain aliphatic mono olefins having from 2 to 8 carbon atoms, and (e) at least one organic cyclic oxide having at least one ring consisting of one oxygen atom and from 2 to 4 carbon atoms.

2. The method which comprises delivering an essentially pure inert liquid hydrocarbon solvents of at least 4 carbon atoms to a polymerization reactor, adding an ionic catalyst and a polymerizable monomeric material to said solvent, polymerizing at a temperature of from about 0° to 150° C. said monomeric material with said catalyst in said solvent under an inert atmosphere to form a polymeric material soluble in said solvent and provide a solution of said polymeric material in said solvent, adding a second named inert liquid hydrocarbon solvent for said polymeric material to said polymerization reactor to mix with said solution of said first named solvent and said polymeric material, said second named solvent having a boiling point at least about forty degrees centigrade higher than the boiling point of said first named solvent, heating the resulting solution of said solvents and polymeric material at a temperature sufficient to vaporize at least a substantial amount of said first named solvent and below the boiling point of said second named solvent, withdrawing the resulting vaporized first named solvent from said reactor, withdrawing the composition comprising said polymeric material, said second named solvent and catalyst residues from said reactor, cooling and condensing said vaporized first named solvent, and returning said condensed first named solvent to said reactor and mixing the same with fresh polymerizable monomeric material and an ionic catalyst to polymerize said fresh monomeric material, said monomeric material being selected from the group consisting of (a) at least one diene having from 4 to 8 carbon atoms and affording 1,4 addition, (b) at least one styrene, (c) mixtures of (a) and (b), (d) mixtures of straight-chain aliphatic mono olefins having from 2 to 8 carbon atoms, and (e) at least one organic cyclic oxide having at least one ring consisting of one oxygen atom and from 2 to 4 carbon atoms.

3. The method of claim 2 containing the additional step of mixing finely divided carbon black with said composition of said polymeric material and said second named solvent to form a mixture, and dispersing the resulting mixture in water at a temperature sufficient to coagulate said polymeric material and to vaporize said second named solvent.

4. The method of claim 2 containing the additional step of mixing finely divided carbon black with said composition of said polymeric material and said second named solvent to form a mixture, adding a stream of said mixture to boiling water to form globules of said polymeric material in said water and withdrawing said mixture of globules and water substantially as soon as said globules are formed from the mixing zone of said stream and water and while evaporating said second named solvent to form finely divided carbon black containing particles of said polymeric material in water.

5. The method of claim 2 containing the additional step of mixing finely divided carbon black with said composition of said polymeric material and said second named solvent to form a mixture, intermittently adding a stream of said mixture to boiling water, and, between said intermittent additions of said stream to said water, agitating the same to break up the agglomerates formed and to provide finely divided carbon black containing particles of said polymeric material in water with removal of said second named solvent.

6. The method of claim 2 containing the additional step of mixing said composition of said polymeric material and said second named solvent with a suspension of water and finely divided carbon black at a temperature sufficient to coagulate said polymeric material to form finely divided particles of said polymeric material containing carbon black in water and to vaporize said second named solvent.

7. The method of claim 2 containing the additional step of forming a mixture of said polymeric material and said second named solvent with carbon black and water and steam distilling said mixture to vaporize said second named solvent from said mixture and to coagulate said polymeric material to form finely divided particles of said polymeric material containing carbon black dispersed in said water.

8. The method of claim 7 containing the additional step of filtering said mixture of carbon black containing polymeric material to obtain a relatively dry crumb.

9. The method of claim 2 containing the additional step of mixing together said polymeric material and said second named organic solvent with an emulsifier for said polymeric material and water to form a mixture and agitating and steam stripping said mixture to remove said solvent and form a latex.

10. The method of claim 9 in which said mixture additionally contains finely divided carbon black.

References Cited by the Examiner
UNITED STATES PATENTS

| | | | |
|---|---|---|---|
| 2,727,022 | 12/1955 | Linsk | 260—33.6 |
| 2,940,960 | 6/1960 | Tegge et al. | 260—29.7 |
| 2,953,554 | 9/1960 | Miller et al. | 260—94.3 |

MURRAY TILLMAN, *Primary Examiner.*

DANIEL ARNOLD, LEON J. BERCOVITZ, WILLIAM H. SHORT, *Examiners.*

E. B. WOODRUFF, J. ZIEGLER, *Assistant Examiners.*